(12) United States Patent
Balvanz

(10) Patent No.: US 11,511,358 B2
(45) Date of Patent: Nov. 29, 2022

(54) DRILL GUIDE FOR HAND-HELD DRILL

(71) Applicant: The Boeing Company, Chicago, IL (US)

(72) Inventor: Justin William Balvanz, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 303 days.

(21) Appl. No.: 16/819,868

(22) Filed: Mar. 16, 2020

(65) Prior Publication Data

US 2021/0283694 A1 Sep. 16, 2021

(51) Int. Cl.
*B23B 45/00* (2006.01)
*B23B 49/00* (2006.01)
*B25H 1/00* (2006.01)

(52) U.S. Cl.
CPC .......... *B23B 45/003* (2013.01); *B23B 49/008* (2013.01); *B25H 1/0078* (2013.01); *Y10T 408/569* (2015.01); *Y10T 408/5623* (2015.01)

(58) Field of Classification Search
CPC ..... B23B 45/003; B23B 47/34; B23B 49/003; B23B 49/008; B23B 2270/30; B25F 5/003; B23Q 11/0071; B23Q 11/0092; B23Q 5/20; B25H 1/0078; Y10T 408/5623; Y10T 408/569; Y10T 408/8588; Y10S 408/712
See application file for complete search history.

(56) References Cited

U.S. PATENT DOCUMENTS

| 2,246,916 | A | * | 6/1941 | Fischer | B23Q 11/0046 408/58 |
| 4,538,943 | A | * | 9/1985 | Clifton | B23B 49/008 408/72 B |
| 4,802,798 | A | * | 2/1989 | Adamson | B23B 49/008 408/112 |
| 5,810,828 | A | * | 9/1998 | Lightman | B23B 49/008 606/80 |

(Continued)

FOREIGN PATENT DOCUMENTS

| EP | 1671752 A1 * | 6/2006 | ......... B23B 51/0054 |
| GB | 533892 A | 2/1941 | |

(Continued)

OTHER PUBLICATIONS

Machine Translation, JP 2008-23622 A. (Year: 2008).*

(Continued)

*Primary Examiner* — Chwen-Wei Su
(74) *Attorney, Agent, or Firm* — Alleman Hall Creasman & Tuttle LLP

(57) ABSTRACT

A drill guide for a drill bit of a hand-held drill is disclosed. The drill guide includes a mount, a telescoping guard, and a guide foot. The mount is configured to couple to a non-rotating portion of the hand-held drill. The telescoping guard extends from the mount and is configured to telescope into a retracted position from an extended position. The guide foot is coupled to the telescoping guard opposite the mount such that the drill guide enshrouds the drill bit when the telescoping guard is in the extended position, and the drill bit passes through the guide foot as the telescoping guard telescopes into the retracted position from the extended position.

20 Claims, 6 Drawing Sheets

(56) References Cited

U.S. PATENT DOCUMENTS

| | | | |
|---|---|---|---|
| 6,146,066 A * | 11/2000 | Yelton | B23Q 11/0046 409/137 |
| 6,382,890 B1 | 5/2002 | Linderholm | |
| 7,503,733 B2 * | 3/2009 | Jenkins | B25F 5/003 408/97 |
| 9,883,853 B2 | 2/2018 | Woodard et al. | |
| 2014/0072380 A1 * | 3/2014 | Khurana | B23B 31/005 408/1 R |
| 2017/0252833 A1 * | 9/2017 | Bayona Salazar | B25F 5/026 |
| 2019/0111500 A1 * | 4/2019 | Li | B23B 49/005 |
| 2021/0245371 A1 | 8/2021 | Crivella | |

FOREIGN PATENT DOCUMENTS

| | | | | |
|---|---|---|---|---|
| JP | 2008023622 A * | 2/2008 | | |
| WO | WO-2014067497 A2 * | 5/2014 | | B23Q 11/0071 |

OTHER PUBLICATIONS

Machine Translation, WO 2014/067497 A2. (Year: 2014).*
"New u-GUARD Non-marring Covered Tools Includes Bits, Bit Holders and Nutsetters," Thomas Net, Available Online at https://news.thomasnet.com/fullstory/new-u-guard-non-marring-covered-tools-includes-bits-bit-holders-and-nutsetters-40031276, Nov. 12, 2019, 6 pages.
Grill Press Guard, 2⅛in. Chuck, Grainger, Available at https://www.grainger.com/product/29DY67, Feb. 11, 2020 2 pages.

* cited by examiner

DRILL GUIDE FOR HAND-HELD DRILL

FIELD

The present disclosure relates generally to the field of hand-held tools, and more specifically to a drill guide for a drill bit of a hand-held drill.

BACKGROUND

A drill guide may be used to align a drill bit of a hand-held drill with a surface of a material to be drilled. The drill guide enables smooth and controlled operation of the hand-held drill during manual drilling operations. In particular, the drill guide prevents the drill bit from slipping when initially breaching the surface of the material to start drilling a hole. Further, the drill guide maintains the drill bit continually in alignment with the surface as the drill bit is driven into the material to form a straight hole.

SUMMARY

A drill guide for a drill bit of a hand-held drill is disclosed. The drill guide includes a mount, a telescoping guard, and a guide foot. The mount is configured to couple to a non-rotating portion of the hand-held drill. The telescoping guard extends from the mount and is configured to telescope into a retracted position from an extended position. The guide foot is coupled to the telescoping guard opposite the mount such that the drill guide enshrouds the drill bit when the telescoping guard is in the extended position, and the drill bit passes through the guide foot as the telescoping guard telescopes into the retracted position from the extended position.

The features, functions, and advantages that have been discussed can be achieved independently in various embodiments or may be combined in yet other embodiments further details of which can be seen with reference to the following description and drawings.

DETAILED DESCRIPTION

A drill guide may be used to align a drill bit of a hand-held drill with a surface of a material to be drilled. For example, one state of the art type of drill guide is a separate component that requires a human operator to manually hold the drill guide in place against a surface, and manually aim and insert the drill bit into the drill guide. Since the human operator of the hand-held drill is required to hold this type of drill guide in place in proximity to the drill bit during manual drilling operations, the operator's hand is at risk of contacting the drill bit, such as if the drill and/or the operator's hand slips, or if the drill bit fractures or comes loose during a drilling operation. Moreover, the operator's hand is also at risk of being struck by debris from the manual drilling operation.

The present description is directed to a drill guide for a drill bit of a hand-held drill that couples to a non-rotating portion of the hand-held drill and provides protection for an operator's hands during manual drilling operations. In one example, the drill guide includes a telescoping guard that enshrouds the drill bit during manual drilling operations, such that the operator's hands are not exposed to the drill bit and/or drilling debris. Also, the telescoping guard is configured such that one of the operator's hands can safely hold the telescoping guard to provide additional support of the hand-held drill and drill guide during manual drilling operations.

Figure 1:
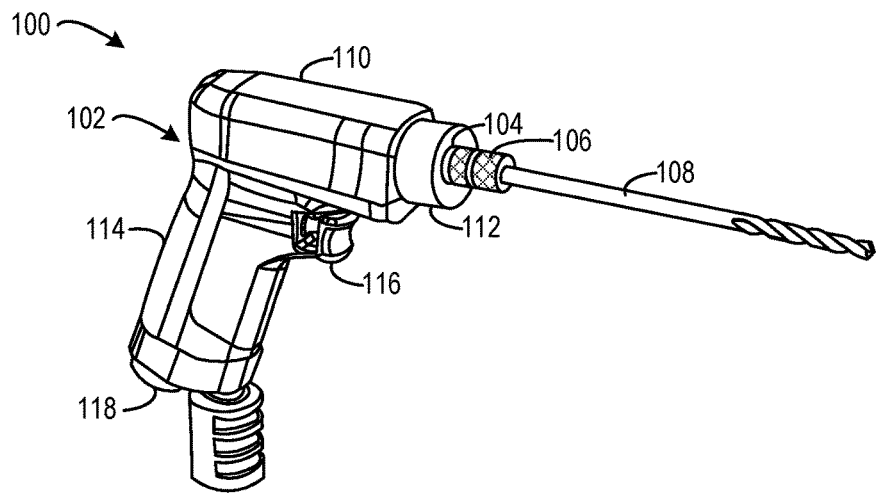
FIG. 1 shows an exemplary hand-held drill.

FIG. 1 shows an exemplary hand-held drill 100. The hand-held drill 100 includes a body 102, a spindle 104, a quick release mechanism 106, and a drill bit 108. The body 102 forms a non-rotating portion of the hand-held drill 100. The spindle 104, the quick release mechanism 106, and the drill bit 108 collectively form a rotating portion of the hand-held drill 100. The spindle 104 forms an external rotating axis that extends from the body 102. The spindle 104 is coupled to the quick release mechanism 106. The quick release mechanism 106 is configured to switch between a retention state and a release state. In the retention state, the quick release mechanism 106 is configured to retain the drill bit 108 in a fixed position relative to the spindle 104. In the release state, the quick release mechanism 106 is configured to allow the drill bit 108 to be inserted into and removed from the quick release mechanism 106. The quick release mechanism 106 may be configured to selectively retain any suitable type of drill bit. Moreover, the quick release mechanism 106 may quickly transition (e.g., responsive to manual manipulation) between the release state and the retention state to change drill bits.

The body 102 includes an upper motor housing 110, a collar 112, a handle 114, a trigger 116, and a power interface 118. The upper motor housing 110 contains a motor (not shown) configured to rotate the spindle 104, the quick release mechanism 106, and the drill bit 108 responsive to actuation of the trigger 116. The collar 112 is affixed to the upper motor housing 110 such that the collar 112 is part of the non-moving portion of the body 102. The collar 112 contains a drive gear (not shown) configured to translate motor torque from the motor to rotate the spindle 104, quick release mechanism 106, and drill bit 108. The handle 114 is configured to be grasped by a hand of an operator of the hand-held drill 100. The trigger 116 is actuatable to activate the drill motor and cause rotation of the drill bit 108. The hand-held drill 100 may be configured to rotate the drill bit 108 clockwise or counterclockwise based on a state of a rotation selector (not shown). The power interface 118 is configured to connect the hand-held drill 100 to a power source that is configured to provide power to the drill's motor. In the illustrated embodiment, the hand-held drill 100 is a pneumatic drill, and the power interface 118 is configured to connect to a pneumatic power source, such as an air compressor. In other embodiments, the hand-held drill may be powered via a different power source (e.g., AC power or a DC battery). Drill 100 is non limiting, and the drill guides disclosed herein may be adapted to work with virtually any hand-held drill.

Figure 2:
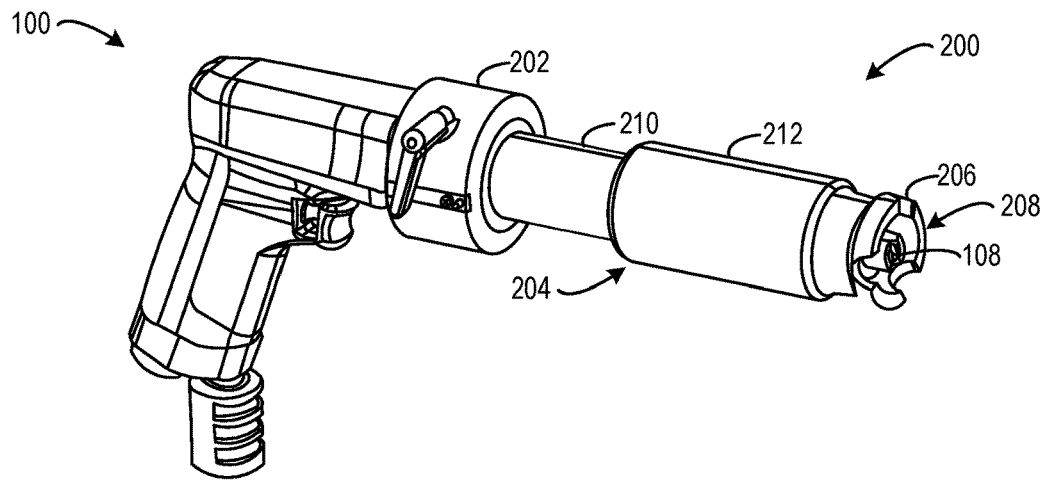
FIG. 2 shows an exemplary drill guide coupled to the hand-held drill of FIG. 1 when the drill guide is in an extended position.
Figure 3:
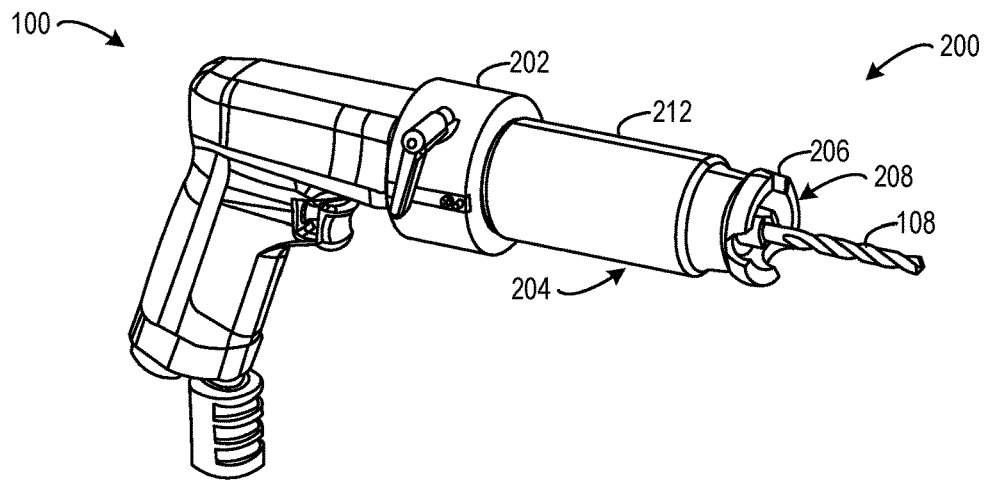
FIG. 3 shows the exemplary drill guide of FIG. 2 in a retracted position.

FIGS. 2 and 3 show an exemplary drill guide 200 configured to couple to the hand-held drill 100 of FIG. 1. The drill guide 200 includes a mount 202, a telescoping guard 204, and a guide foot 206. The telescoping guard 204 extends from the mount 202. The guide foot 206 is coupled to the telescoping guard 204 opposite the mount 202.

The mount 202 is configured to couple to a non-rotating portion of the hand-held drill 100 and coaxially align the telescoping guard 204 and the guide foot 206 with the drill bit 108. In the illustrated embodiment, the mount 202 is configured to clamp to the non-rotating collar 112 shown in FIG. 1. In other embodiments, the mount may be configured to couple to a different non-rotating component of the hand-held drill and/or couple in a non-clamping fashion.

When the telescoping guard 204 is in the extended position, the drill guide 200 fully enshrouds the drill bit 108. In other words, the telescoping guard 204 forms a physical barrier between the drill bit 108 and a human operator's hands so that the human operator's hands are protected from the drill bit 108. In the illustrated example, the telescoping guard 204 cylindrically enshrouds the drill bit 108, although differently-shaped telescoping guards may be used. A working end of the drill bit 108 may be substantially flush with, or retracted into, the telescoping guard 204 relative to an exterior edge 208 of the guide foot 206 when the telescoping guard 204 is in the extended position. As such, the human operator's hands are protected from even the working tip of the drill bit 108. Nonetheless, the human operator may use the guide foot to precisely aim the drill bit while the drill bit remains enshrouded in the telescoping guard 204.

The telescoping guard 204 is configured to telescope between a retracted position (shown in FIG. 3) and an extended position (shown in FIG. 2). For example, during use, the telescoping guard 204 telescopes from the extended position into the retracted position, thus allowing the drill bit 108 to penetrate into a material being drilled (not shown). In particular, the telescoping guard 204 includes an interior guard 210 coupled to the mount 202 and an exterior guard 212 coupled to the guide foot 206. The exterior guard 212 is telescopically coupled around the interior guard 210. As illustrated, the interior guard 210 and the exterior guard 212 are cylindrical tubes having different diameters that allow telescoping action. In FIG. 2, the exterior guard 212 has an inner diameter that is greater than an outer diameter of the interior guard 210 such that the interior guard 210 telescopes into the exterior guard 212. The telescoping guard 204 is fully retracted when the exterior guard 212 abuts the mount 202. The drill bit 108 passes through both the interior guard 210 and the exterior guard 212, and then the guide foot 206, as the telescoping guard 204 telescopes into the retracted position from the extended position, such that the drill bit 108 continues to be enshrouded collectively by the drill guide 200 and the material being drilled as the drill bit 108 drills into the material. In this way, the drill bit 108 is not exposed to an operator's hand during manual drilling operations.

The guide foot 206 is configured to align the drill bit 108 normal to a surface of a material to be drilled by the hand-held drill 100. Such surface-normal alignment is achieved by the drill bit 108 being coaxially aligned with the guide foot 206 via the coupling of the mount 202 to the non-rotating portion of the hand-held drill 100. In other embodiments, the guide foot may be angled to align the drill bit at a desired, non-normal angle (e.g., 45 degrees).

The configuration shown in FIGS. 2 and 3 may be referred to as "rear action," because the rear/proximal end (left side) of the telescoping guard 204 is interior the front/distal end (right side) of the telescoping guard when the drill guide telescopes.

Figure 4:
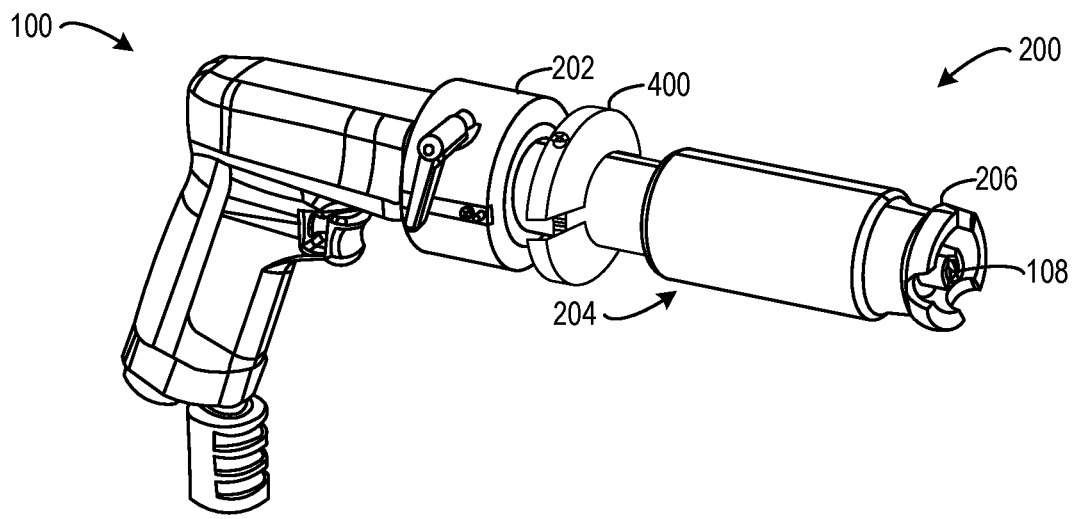
FIG. 4 shows an exemplary drill guide including a drill stop, wherein the drill guide is in an extended position.
Figure 5:
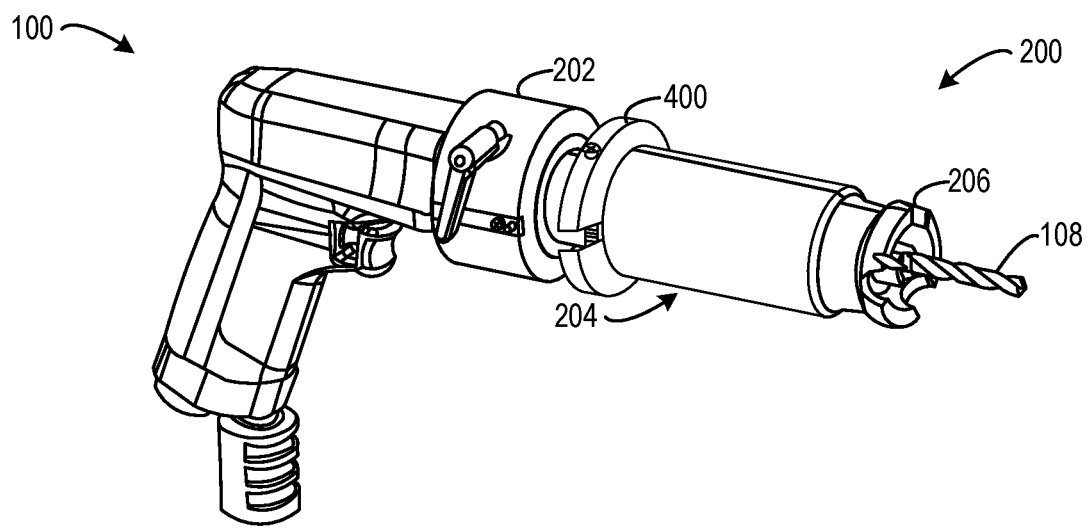
FIG. 5 shows the exemplary drill guide of FIG. 4 in a retracted position.

FIGS. 4-5 show an alternative embodiment of the drill guide 200 that includes a drill stop 400. The drill stop 400 dictates a telescopic range of motion of the telescoping guard 204 that correspondingly dictates a drill depth of the drill bit 108. The drill stop 400 is configured to be translated longitudinally along the interior guard 210 when the drill guide is in the extended position (shown in FIG. 4). Further, the drill stop 400 is configured to be selectively clamped or otherwise affixed to the interior guard 210 at a desired longitudinal position, thus setting the depth of the drill bit 108. The drill stop 400 may be configured to selectively clamp or otherwise affix to the interior guard 210 using any suitable mechanism. The telescoping guard 204 is configured to telescope into the retracted position (shown in FIG. 5) from the extended position (shown in FIG. 4). In particular, the interior guard 210 telescopes into the exterior guard 212 until the exterior guard 212 abuts the drill stop 400, at which point the drill bit 108 extends beyond the exterior edge 208 of the guide foot 206 by the desired depth. The drill stop 400 may be used to set the drill depth of the drill bit 108 such that the drill bit 108 does not drill deeper than a desired drill depth.

Figure 6:
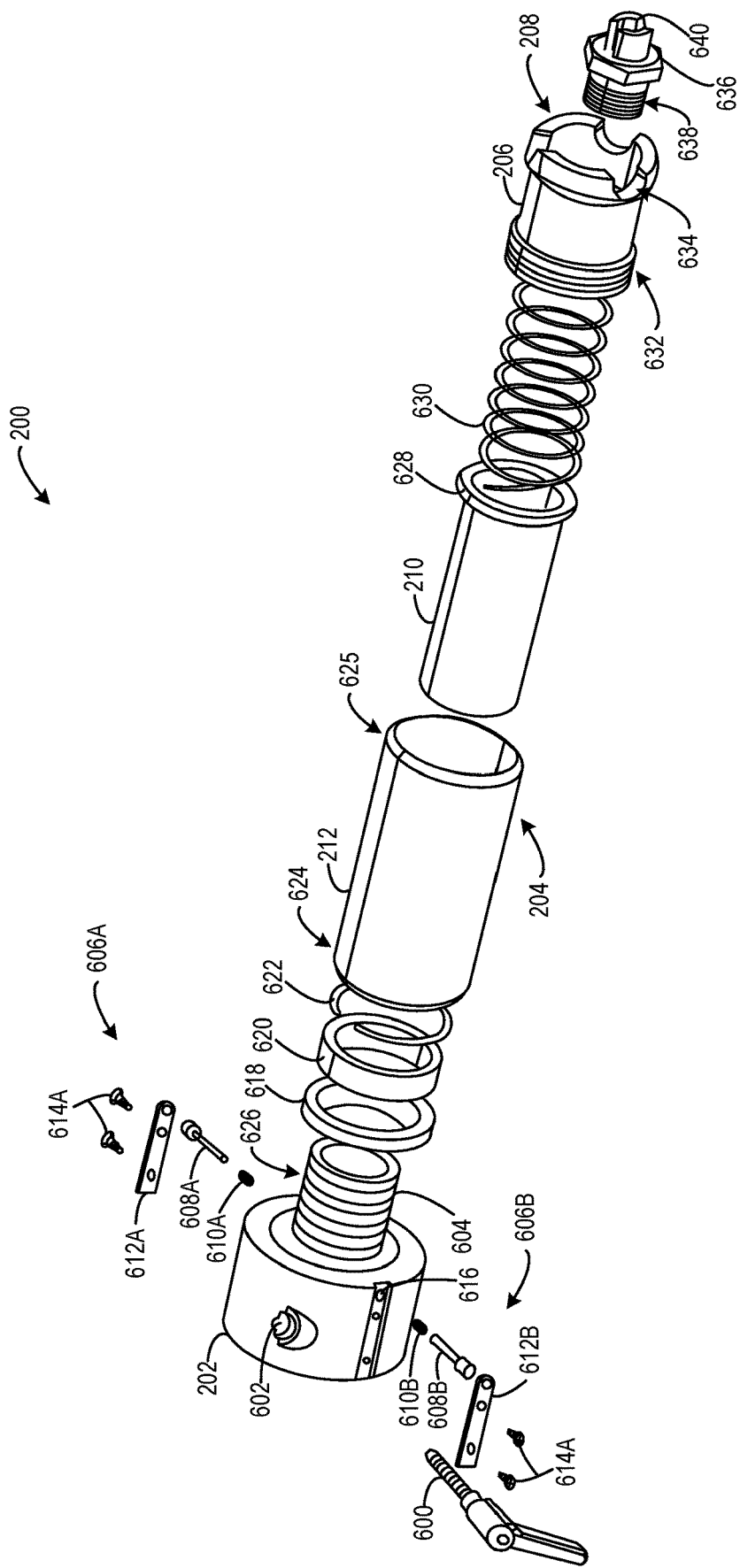
FIG. 6 shows an exploded view of the exemplary drill guide of FIG. 2.

FIG. 6 shows an exploded view of the drill guide 200. The mount 202 includes a clamp bolt 600 configured to screw into a threaded aperture 602 to selectively reduce an interior diameter of the mount 202, to clamp to a non-rotating portion of a hand-held drill, such as the non-rotating collar 112 of the hand-held drill 100 shown in FIG. 1. The mount may include any suitable coupling mechanism to couple to a non-rotating portion of a hand-held drill. The mount 202 includes a neck 604 having an interior diameter sized to accommodate a drill bit, such as the drill bit 108 of the hand-held drill 100 shown in FIG. 1. The neck 604 has an exterior diameter that is matched to an interior diameter of the interior guard 210 such that the interior guard 210 slides over the neck 604 to couple the mount 202 to the telescoping guard 204.

The mount may have an interior diameter sized to accommodate any suitable drill geometry. In some embodiments, the mount may be one of a plurality of differently configured mounts that can be switched out of the drill guide to match different drill geometries (e.g., having different bore diameters). In some embodiments, a drill may be preconfigured to receive a complementary mount; while in some embodiments, the mount may be configured to couple to a drill that was not originally designed with a telescoping guard in mind.

Illustrated mount 202 includes a pair of spindle lock assemblies 606 (e.g., 606A and 606B). Each spindle lock assembly 606 includes a lock button 608 (e.g., 608A and 608B), a bias spring 610 (e.g., 610A and 610B), a lock retainer 612 (e.g., 612A and 612B), and a pair of lock screws 614 (e.g., 614A and 614B). The lock button 608 and the bias spring 610 are inserted into an opening 616 in the mount 202. The opening 616 is configured to align with a spindle of a hand-held drill when the drill guide is coupled to the hand-held drill. The lock button 608 and the bias spring 610 are retained in the opening 616 by the lock retainer 612, which is coupled to the mount 202 via the pair of lock screws 614. The bias spring 610 is configured to push the lock button 608 outward such that the lock button 608 does not engage the spindle. Further, the lock button 608 may be pushed inward with enough force to overcome the spring force of the bias spring 610 to engage the spindle and prevent the spindle and correspondingly the drill bit from rotating. The pair of lock buttons 608 may be used in conjunction to lock the spindle in place to allow a user to manually rotate the assembly of the integrated drill guide and the hand-held drill.

A rod wiper 618, an internal bushing 620, and an internal retaining ring 622 are configured to be coupled inside a rear end 624 of the exterior guard 212. The rod wiper 618 has an interior diameter that is greater than the exterior diameter of the interior guard 210. The rod wiper 618 has an exterior diameter that is less than the interior diameter of the exterior guard 212. The rod wiper 618 is configured to keep the telescoping guard 204 clean and free from foreign matter by preventing contaminants from reaching an interior portion of the telescoping guard 204. The rod wiper 618 may include any suitable compliant material that can create a seal between the interior guard 210 and the exterior guard 212, such as silicone, rubber, or another elastomer polymer.

The internal bushing 620 has an interior diameter that is greater than the exterior diameter of the interior guard 210. The internal bushing 620 has an exterior diameter that is less than the interior diameter of the exterior guard 212. The internal bushing 620 is configured to reduce friction between the interior guard 210 and the exterior guard 212 during telescoping operation of the telescoping guard 204. The internal bushing 620 may be any suitable friction reducing material, such as cast or machined metals, stabilized polymers (i.e., plastics), fiber-wound composites, and combinations of different types of materials. In other embodiments, bearings may be used to reduce friction between the interior guard and the exterior guard.

The internal retaining ring 622 has an interior diameter that is greater than the exterior diameter of the interior guard 210. The internal retaining ring 622 is deformable to fit within a notch (not shown) in an interior surface of the exterior guard 212 proximate to the rear end 624. When inserted in the notch, the internal retaining ring 622 retains the rod wiper 618 and the internal bushing 620 within the rear end 624 of the exterior guard 212. Moreover, the retainer ring 622 retains the interior guard 210 within the exterior guard 212, such that the guards cannot telescope apart when the telescoping guard 204 is in the extended position.

The interior guard 210 has an interior diameter that is greater than the exterior diameter of the neck 604 of the mount 202, such that the neck 604 is inserted into the interior guard 210. The neck 604 includes threads 626 that are matched to complementary threads (not shown) within the interior guard 210, such that the interior guard 210 can be screwed onto the neck 604 to couple the interior guard 210 to the mount 202. In some examples, the threads 626 are "left-handed", such that the interior guard 210 remains tightened on the neck 604 during manual drilling operations, even if the drill bit exerts a rotational torque on the drill guide 200. The interior guard may couple to the mount in any suitable manner.

The interior guard 210 includes a retention flange 628 having a greater exterior diameter than the exterior diameter of the remainder of the interior guard 210. The exterior diameter of the retention flange 628 is greater than the interior diameter of the retaining ring 622, such that when the rod wiper 618, the internal bushing 620, and the retaining ring 622 are installed within the exterior guard 212, the retaining ring 622 abuts against the retention flange 628. In this way, the exterior guard 212 is retained on the interior guard 210 when the telescoping guard 204 is fully extended.

A coil spring 630 is positioned intermediate the interior guard 210 and the guide foot 206. The coil spring 630 is configured to bias the telescoping guard 204 toward the extended position, such that the drill bit may be enshrouded absent a retraction force that overcomes the bias of the coil spring 630.

The guide foot 206 has an exterior diameter that is less than an interior diameter of the exterior guard 212, such that the guide foot 206 can be inserted into the exterior guard 212. The guide foot 206 includes threads 632 that are matched to complementary threads (not shown) that are positioned within a front end 625 of the exterior guard 212, such that the guide foot 206 can be screwed onto the exterior guard 212 to couple the exterior guard 212 to the guide foot 206. In some examples, the threads 632 are "left-handed", such that the exterior guard 212 remains tightened on the guide foot 206 during manual drilling operations, even if the drill bit exerts a rotational torque on the drill guide 200. The exterior guard may couple to the guide foot in any suitable manner.

The guide foot 206 includes a plurality of cut-outs 634 that are each configured to allow drilling debris to be expelled from the guide foot 206 in a controlled manner during manual drilling operations. In this way, a likelihood that the drill bit is inhibited by drilling debris is reduced.

The guide foot 206 includes a bushing 636 having an exterior diameter less than an interior diameter of the guide foot 206. The bushing 636 includes threads 638 that are matched to complementary threads (not shown) that are positioned within the guide foot 206, such that the bushing 636 can be screwed into the guide foot 206. In some examples, the threads 638 are "left-handed", such that the bushing 636 remains tightened within the guide foot 206 during manual drilling operations, even if the drill bit exerts a rotational torque on the drill guide 200. The bushing may couple to the guide foot in any suitable manner. The bushing 636 has an interior diameter matched to a diameter of the drill bit (i.e., the bushing 636 is large enough to allow the drill bit to freely rotate, but small enough to severely limit or prevent lateral deflection of the drill bit). The bushing 636 is configured such that the drill bit passes through the bushing 636 as the telescoping guard 204 telescopes into the retracted position from the extended position. The matched interior diameter of the bushing 636 provides lateral stability to help maintain alignment of the drill bit relative to the surface of the material being drilled during manual drilling operations. The bushing 636 includes a chip breaker 640 that is configured to break drilling debris into pieces suitably small enough to be expelled through the plurality of cut-outs 634 in a controlled manner.

In some embodiments, the bushing 636 may be one of a plurality of different bushings that are each configured to be interchangeably coupled to the guide foot 206. In some examples, different bushings may have different interior diameters to accommodate differently-sized drill bits. In some examples, different bushing may have different types of chip breakers that are configured to break up different types of material. Any suitable type of bushing may be interchangeably coupled into the guide foot 206.

Figure 7:
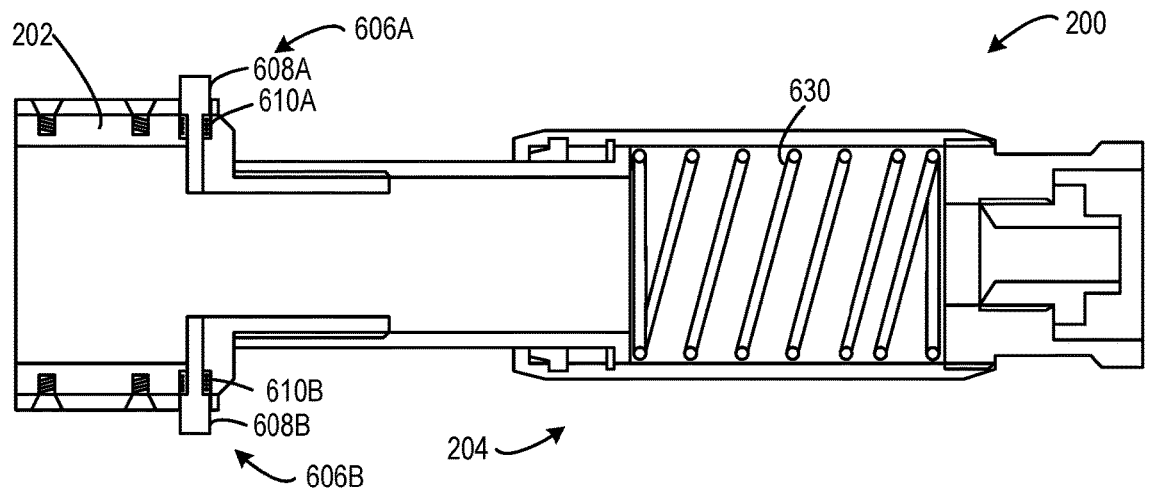
FIG. 7 shows a cross-section of an exemplary rear-action drill guide.

FIGS. 7-10 show cross-section views of the drill guide 200. In FIG. 7, the drill guide 200 is shown not coupled to a hand-held drill, and the telescoping guard 204 is biased to the extended position by the spring 630. Further, the spindle lock assemblies 606 are biased radially outward. In particular, the bias springs 610 push the lock buttons 608 radially outward, such that the lock buttons 608 do not protrude into the interior of the mount 202.

Figure 8:
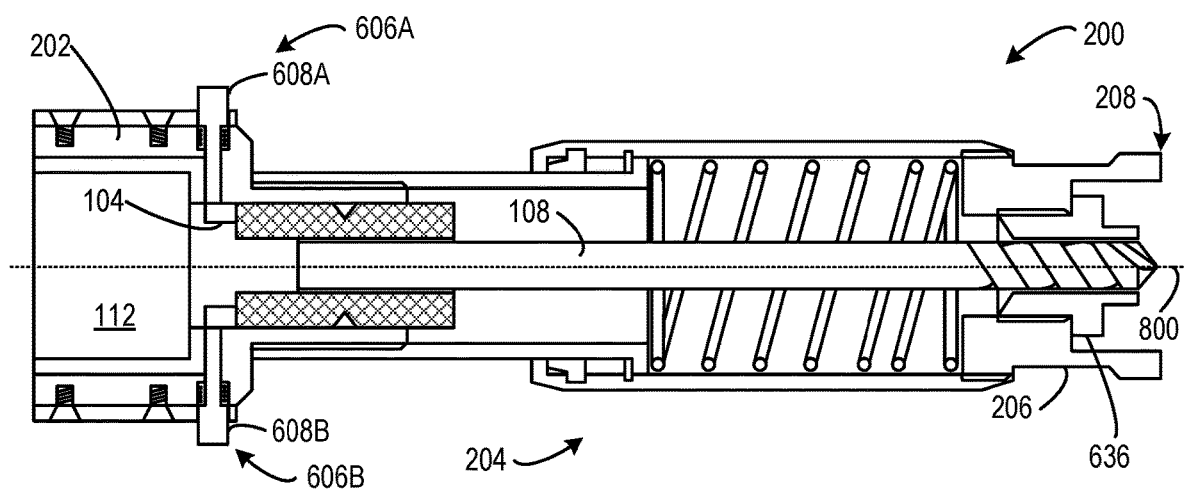
FIG. 8 shows a cross-section of the exemplary rear-action drill guide of FIG. 7 in an extended position and coupled to a hand-held drill.

In FIG. 8, the drill guide 200 is shown coupled to the hand-held drill 100, with the telescoping guard 204 in the extended position. When the drill guide 200 is coupled to the hand-held drill 100, the mount 202, the telescoping guard 204, and the guide foot 206 including the bushing 636 are coaxially aligned with the drill bit 108 along a longitudinal axis 800. However, this is not strictly required, as differently-configured mounts and telescoping guards could be eccentrically aligned. When the telescoping guard 204 is in the extended position, the drill guide 200 fully enshrouds the drill bit 108, and the working end of the drill bit 108 is substantially flush with the exterior edge 208 of the guide foot 206. Additionally, when the drill guide 200 is coupled to the hand-held drill 100, the collar 112 of the hand-held drill 100 abuts the mount 202, such that the lock buttons 608 of the spindle lock assemblies 606 align with the spindle 104 of the hand-held drill 100.

Figure 9:
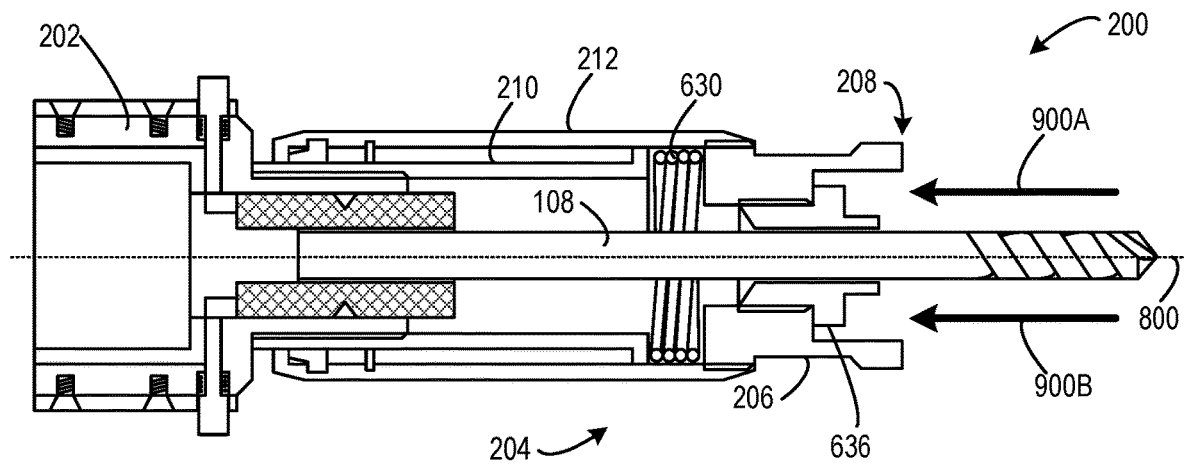
FIG. 9 shows a cross-section of the exemplary rear-action drill guide of FIG. 7 in a retracted position and coupled to a hand-held drill.

In FIG. 9, the drill guide 200 is again shown coupled to the hand-held drill 100, but with the telescoping guard 204 in the retracted position. The telescoping guard 204 telescopes with rear-action along the longitudinal axis 800 from the extended position toward the retracted position, as shown by the horizontal directional arrows 900A, 900B in FIG. 9. When the telescoping guard 204 telescopes from the extended position toward the retracted position, the interior guard 210 translates into the exterior guard 212, and the interior guard 210 compresses the spring 630. Further, when the telescoping guard 204 telescopes from the extended position to the retracted position, the drill bit 108 passes through the guide foot 206 including the bushing 636, such that the drill bit 108 extends beyond the exterior edge 208 of the guide foot 206.

Figure 10:
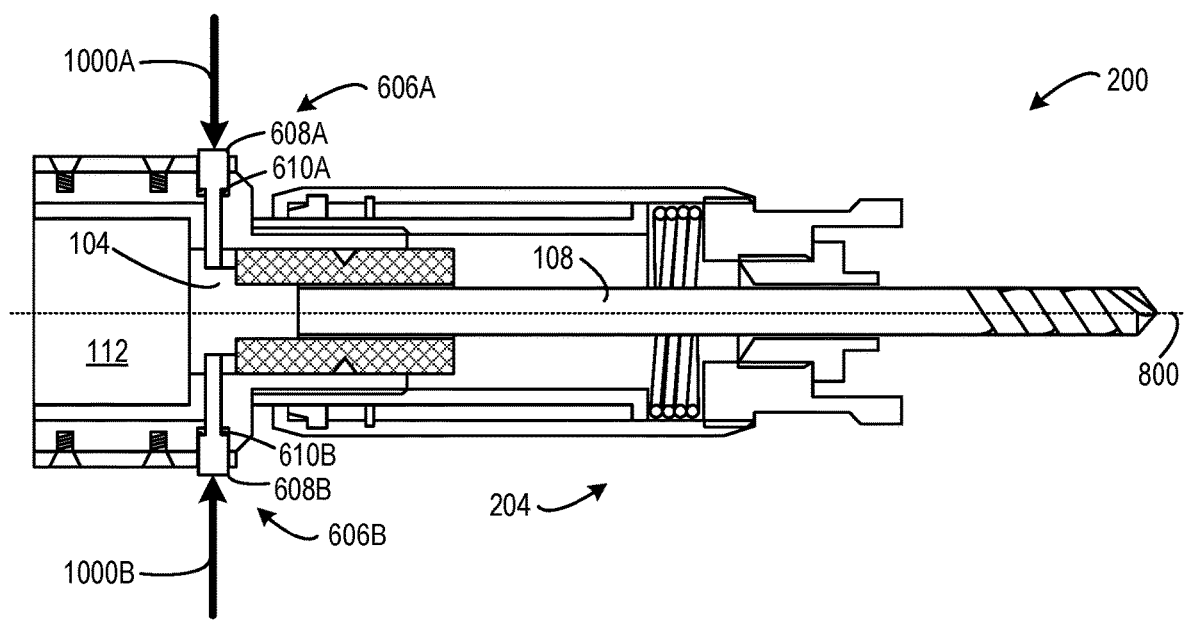
FIG. 10 shows a cross-section of the exemplary rear-action drill guide of FIG. 7 coupled to a hand-held drill and with a spindle lock engaged to lock a spindle of the hand-held drill.

In FIG. 10, the drill guide 200 is again shown coupled to the hand-held drill 100, with the telescoping guard 204 in the retracted position, and with the spindle locks assemblies 606 engaged with the spindle 104 of the hand-held drill 100. In particular, the lock buttons 608 are pushed radially inward, as shown by the vertical directional arrows 1000A, 1000B, such that the lock buttons 608 compress the bias springs 610 and engage the spindle 104 on opposing sides to lock the spindle 104 in place to allow a user to manually rotate the assembly of the drill guide and the hand-held drill.

Figure 11:
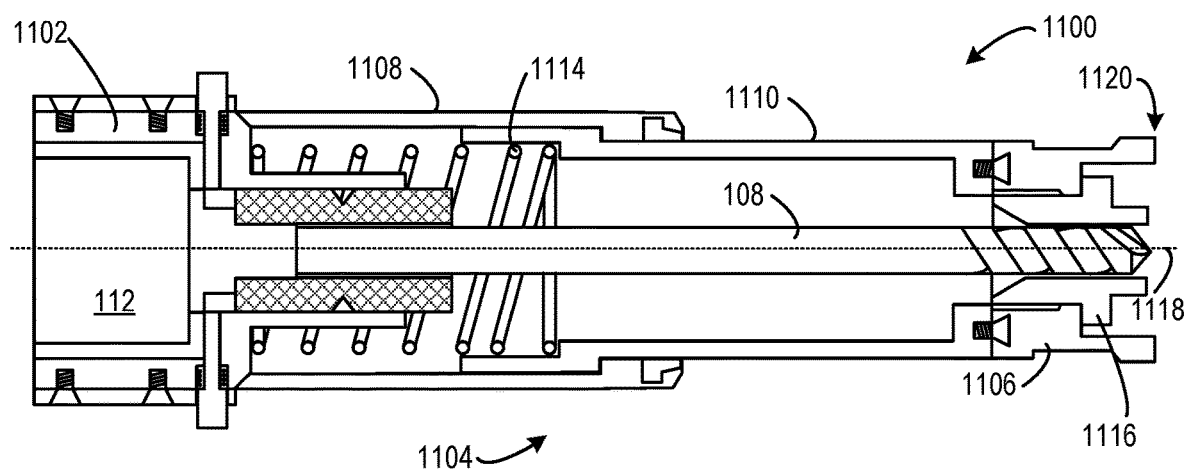
FIG. 11 shows a cross-section of an exemplary forward-action drill guide in an extended position and coupled to a hand-held drill.
Figure 12:
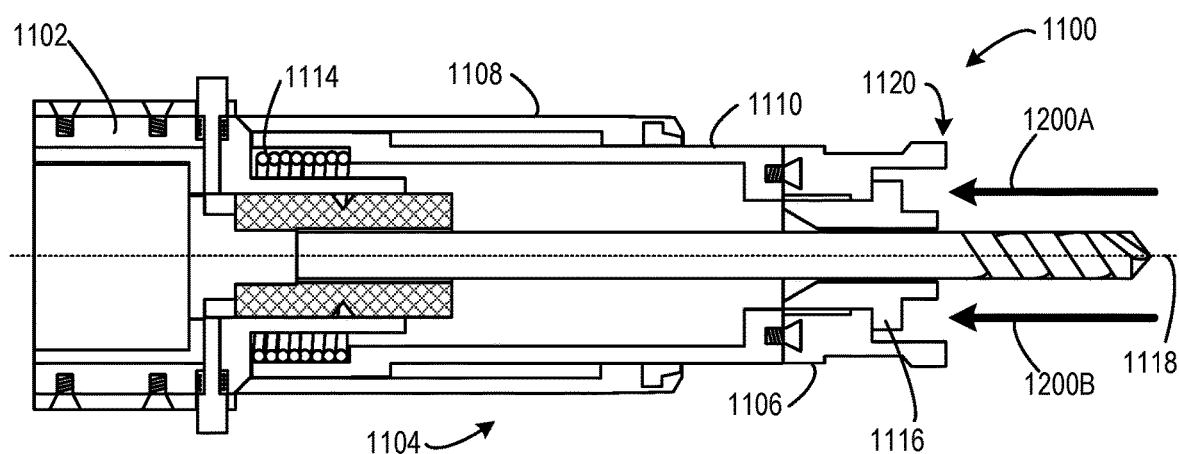
FIG. 12 shows a cross-section of the exemplary forward-action drill guide of FIG. 11 in a retracted position and coupled to a hand-held drill.

FIGS. 11 and 12 show cross-section views of an exemplary forward-action drill guide 1100 shown coupled to the hand-held drill 100 of FIG. 1. The drill guide 1100 includes a mount 1102 configured to couple to the collar 112 of the hand-held drill 100. A telescoping guard 1104 extends from the mount 1102. A guide foot 1106 is coupled to the telescoping guard 1104 opposite the mount 1102.

Unlike the telescoping guard 204 of the drill guide 200 as shown in FIGS. 2-9, the telescoping guard 1104 is configured to telescope between a retracted position and an extended position via forward action. That is, the telescoping guard 1104 includes an exterior guard 1110 coupled to the mount 1102 and an interior guard 1110 coupled to the guide foot 1106. The exterior guard 1108 has an inner diameter that is greater than an outer diameter of the interior guard 1110 such that the interior guard 1110 telescopes into the exterior guard 1108. A coil spring 1114 is positioned intermediate the mount 1102 and the interior guard 1110 within the exterior guard 1108. The coil spring 1114 is configured to bias the telescoping guard 1104 toward the extended position by pushing the interior guard 1110 away from the mount 1102.

The guide foot 1106 includes a bushing 1116 having an interior diameter matched to a diameter of the drill bit. The bushing 1116 is configured such that the drill bit passes through the bushing 1116 as the telescoping guard 1104 telescopes into the retracted position from the extended position. The matched interior diameter of the bushing 1116 provides lateral stability to help maintain alignment of the drill bit relative to a surface of a material being drilled during manual drilling operations.

In FIG. 11, the telescoping guard 1104 is in the extended position such that the mount 202, the telescoping guard 1104, and the guide foot 1106 including the bushing 1116 fully enshroud the drill bit 108. In this state, the drill bit 108 does not extend beyond an exterior edge 1120 of the guide foot. Further, the mount 202, the telescoping guard 1104, and the guide foot 1106 including the bushing 1116 are coaxially aligned with the drill bit 108 along a longitudinal axis 1118 of the drill bit.

In FIG. 12, the telescoping guard 1104 is shown in the retracted position such that the interior guard 1110 telescopes rearward into the exterior guard 1108 along the longitudinal axis 1118 and compresses the coil spring 1114, as shown by the horizontal directional arrows 1200A, 1200B in FIG. 12. When the telescoping guard 1104 telescopes from the extended position toward the retracted position, the drill bit 108 passes through the guide foot 1106 including the bushing 1116 and extends beyond the exterior edge 1120 of the guide foot 1106.

The drill guide 1100 also may include spindle lock assemblies, a rod wiper, an internal bushing, a retaining clip, and a chip breaker that function substantially the same as described above with respect to drill guide 200.

Various components of the herein described drill guides may be optional. For example, in some embodiments, the spindle lock assemblies, the bushing, and/or the chip breaker may be omitted from the drill guide. Various components of the drill guide may be differently configured in different embodiments. For example, different embodiments of the drill guide may have different mounts (e.g., using fasteners, latches, compression fit, magnets), different shaped telescoping guards (e.g., concentric, eccentric, cylindrical, rectangular, pentagonal, hexagonal, octagonal, or other polygonal), different numbers of telescoping segments (e.g., 2, 3, 4 or more), rear-action or front-action telescoping segments, and/or different guide feet (e.g., normal to surface, angled relative to surface, without a bushing, with interchangeable bushings). A telescoping and enshrouding drill guide may include any suitable combination of these different components, and/or other components, without departing from the spirit of this disclosure.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. A drill guide for a drill bit of a hand-held drill, the drill guide comprising:
   a mount configured to couple to a non-rotating portion of the hand-held drill;
   a telescoping guard extending from the mount and configured to telescope into a retracted position from an extended position; and
   a guide foot coupled to the telescoping guard opposite the mount such that the drill guide enshrouds the drill bit when the telescoping guard is in the extended position, wherein the drill bit passes through the guide foot as the telescoping guard telescopes into the retracted position from the extended position, wherein the guide foot includes a bushing having an interior diameter matched to a diameter of the drill bit, wherein the drill bit passes through the bushing as the telescoping guard telescopes into the retracted position from the extended position, and wherein the bushing includes a chip breaker.

2. The drill guide of claim 1, wherein the telescoping guard includes an interior guard coupled to the mount and an exterior guard coupled to the guide foot, and wherein the exterior guard has an inner diameter greater than an outer diameter of the interior guard such that the interior guard telescopes into the exterior guard.

3. The drill guide of claim 1, wherein the telescoping guard includes an exterior guard coupled to the mount and an interior guard coupled to the guide foot, and wherein the exterior guard has an inner diameter greater than an outer diameter of the interior guard such that the interior guard telescopes into the exterior guard.

4. The drill guide of claim 1, wherein the bushing is one of a plurality of different bushings configured to be interchangeably coupled to the guide foot, each of the plurality of different bushings having a different interior diameter to accommodate a differently-sized drill bit.

5. The drill guide of claim 4, wherein each of the plurality of different bushings includes threads for interchangeably coupling to complementary threads of the guide foot.

6. The drill guide of claim 1, wherein the mount is configured to coaxially align the telescoping guard and the guide foot with the drill bit.

7. The drill guide of claim 1, where the mount is configured to clamp to a non-rotating collar of the hand-held drill.

8. The drill guide of claim 1, further comprising a spring configured to bias the telescoping guard toward the extended position.

9. The drill guide of claim 1, further comprising a spindle lock configured to selectively engage and lock a spindle of the hand-held drill.

10. A drill guide for a drill bit of a hand-held drill, the drill guide comprising:
    a mount configured to couple to a non-rotating portion of the hand-held drill;
    a telescoping guard extending from the mount and configured to telescope into a retracted position from an extended position; and
    a guide foot coupled to the telescoping guard opposite the mount such that the drill guide enshrouds the drill bit when the telescoping guard is in the extended position, the guide foot including a bushing having an interior diameter matched to a diameter of the drill bit, wherein the drill bit passes through the bushing as the telescoping guard telescopes into the retracted position from the extended position, wherein the bushing is one of a plurality of different bushings configured to be interchangeably coupled to the guide foot, each of the plurality of different bushings having a different interior diameter to accommodate a differently-sized drill bit, and wherein each of the plurality of different bushings includes threads for interchangeably coupling to complementary threads of the guide foot.

11. The drill guide of claim 10, wherein the telescoping guard includes an interior guard coupled to the mount and an exterior guard coupled to the guide foot, and wherein the exterior guard has an inner diameter greater than an outer diameter of the interior guard such that the interior guard telescopes into the exterior guard.

12. The drill guide of claim 10, wherein the telescoping guard includes an exterior guard coupled to the mount and an interior guard coupled to the guide foot, and wherein the exterior guard has an inner diameter greater than an outer diameter of the interior guard such that the interior guard telescopes into the exterior guard.

13. The drill guide of claim 10, wherein the bushing includes a chip breaker.

14. The drill guide of claim 10, further comprising a spring configured to bias the telescoping guard toward the extended position.

15. The drill guide of claim 10, further comprising a spindle lock configured to selectively engage and lock a spindle of the hand-held drill.

16. A drill guide for a drill bit of a hand-held drill, the drill guide comprising:
    a mount configured to couple to a non-rotating collar of the hand-held drill;
    a spindle lock positioned on the mount and configured to selectively engage and lock a spindle of the hand-held drill;
    an interior guard extending from the mount;
    an exterior guard telescopically coupled around the interior guard; and
    a guide foot coupled to the exterior guard and including a bushing having an interior diameter matched to a diameter of the drill bit, wherein the exterior guard enshrouds the drill bit when the exterior guard is telescopically extended, wherein the drill bit passes through the bushing when the exterior guard is telescopically retracted, and wherein the bushing includes a chip breaker.

17. The drill guide of claim 16, wherein the bushing is one of a plurality of different bushings configured to be interchangeably coupled to the guide foot, each of the plurality of different bushings having a different interior diameter to accommodate a differently-sized drill bit.

18. The drill guide of claim 17, wherein each of the plurality of different bushings includes threads for interchangeably coupling to complementary threads of the guide foot.

19. The drill guide of claim 16, wherein the mount is configured to coaxially align the interior guard, the exterior guard, and the guide foot with the drill bit.

20. The drill guide of claim 16, further comprising a spring configured to bias the exterior guard relative to the interior guard toward an extended position.

* * * * *